(No Model.) 2 Sheets—Sheet 1.
J. B. JESSON & J. K. WEED.
MACHINE FOR SLOTTING AND BORING UMBRELLA OR OTHER STICKS.
No. 445,145. Patented Jan. 20, 1891.
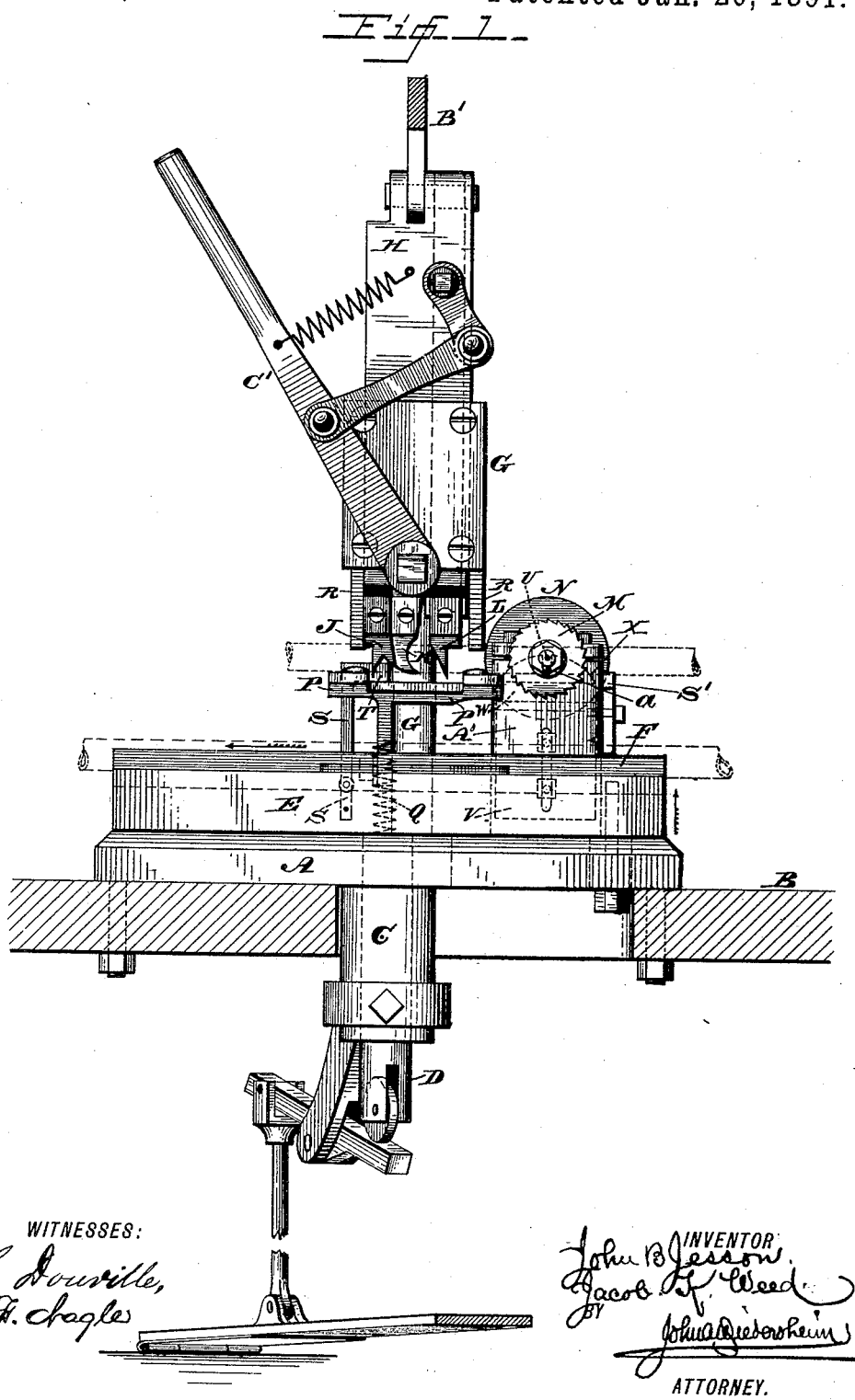
WITNESSES:
L. Douville,
P. F. Chagle
INVENTOR:
John B Jesson.
Jacob K. Weed.
BY
Joshua Giebersheim
ATTORNEY.

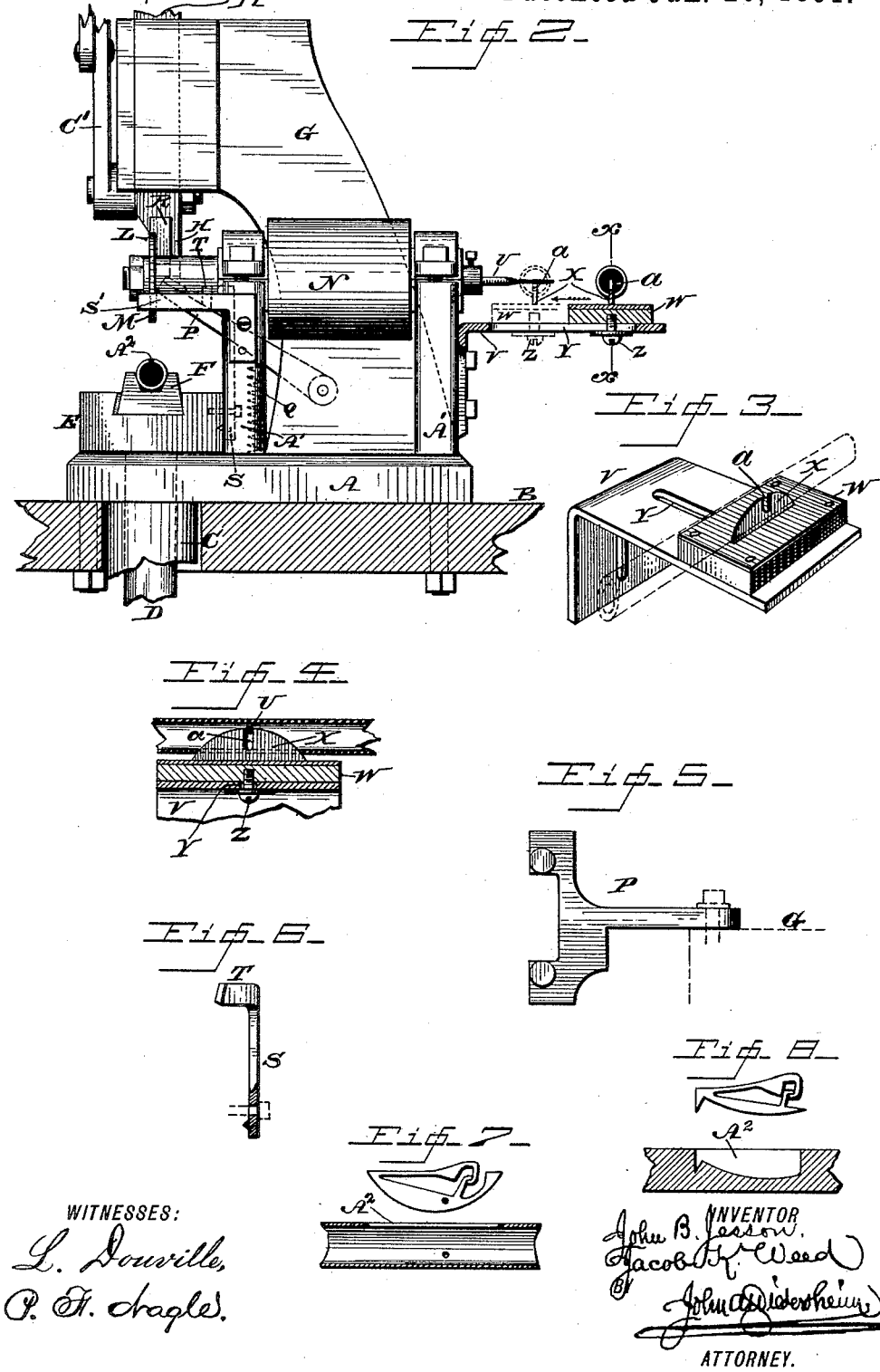

UNITED STATES PATENT OFFICE.

JOHN B. JESSON, OF CAMDEN, NEW JERSEY, AND JACOB K. WEED, OF PHILADELPHIA, PENNSYLVANIA, ASSIGNORS OF ONE-THIRD TO LEONARD E. LADD, OF PHILADELPHIA, PENNSYLVANIA.

MACHINE FOR SLOTTING AND BORING UMBRELLA OR OTHER STICKS.

SPECIFICATION forming part of Letters Patent No. 445,145, dated January 20, 1891.

Application filed February 19, 1890. Serial No. 340,988. (No model.)

*To all whom it may concern:*

Be it known that we, JOHN B. JESSON, residing in the city and county of Camden, State of New Jersey, and JACOB K. WEED, residing in the city and county of Philadelphia, State of Pennsylvania, citizens of the United States, have invented a new and useful Improvement in Machines for Slotting and Boring Umbrella and other Sticks, which improvement is fully set forth in the following specification and accompanying drawings.

Our invention consists in improvements in a machine for slotting umbrella and other sticks and articles, as shown in the Letters Patent No. 410,975, granted to John B. Jesson and Jacob K. Weed, assignors, &c., on the 10th day of September, 1889; and it consists of a gage or stop for limiting the downward motion of the plunger of the cutters, so that the depth of the cut is limited, and the cuts in different sticks or pieces are uniform in their nature, said gage also serving as a stripper.

It also consists in providing the machine with a boring tool or drill, whereby openings may be formed in the stick or article to receive the fastening rivets or pins.

It also consists of other novel features, as will be hereinafter fully set forth and definitely claimed.

Figure 1 represents a side elevation of a slotting and boring machine embodying our invention. Fig. 2 represents a view of a portion at a right angle to Fig. 1. Fig. 3 represents a perspective view of the carriage of the boring-tool. Fig. 4 represents a vertical section on line $x\,x$, Fig. 2. Figs. 5 and 6 represent views of a gage and stop. Figs. 7 and 8 represent the work of the machine.

Similar letters of reference indicate corresponding parts in the several figures.

Referring to the drawings, A designates the base of the machine, the same being secured in any suitable manner to the stationary table B, said base having a depending boss C, within which is guided the stem D of the rising and falling bed or table E, the latter being provided with a channel-slide F, which is adapted to travel in the direction of the length of the machine, as indicated by the arrow, Fig. 1, and receive the stick or handle to be slotted.

Rising from the bed A is a standard G, to which is fitted the plunger H, the lower end whereof carries cutters J K L.

Mounted on the base A are the pillow-blocks A', and driven in any suitable manner is a circular saw M, the arbor whereof has keyed or otherwise secured to it a drum N, around which passes an operating-belt.

P designates a gage, which is pivoted at its inner end to the lower portion of the standard G, and having bearing against it the spring Q, whereby said gage is held in elevated position, as shown in Figs. 1 and 2, it being noticed that said gage is in the path of the side pieces R of the plunger H, so that when said plunger descends it lowers the gage P and presses the same against the stick on the slide F.

Rising from the bed E is a stop S, which is so disposed that when the gage P is raised it abuts against the lip T of said stop S, thus limiting the upward motion of the stick, as will be hereinafter explained.

Secured to the pillow-blocks A' is a stop S', the same being located at the side of the saw for limiting the upward motion of the stick when raised.

Secured to the arbor of the saw M is a boring tool or bit U, and below the same is a table V, on which is supported a carriage W, which, as will be seen in Fig. 2, is adapted to have motion in the direction to and from the boring-bit. Rising from the carriage W is a guide X, the same being adapted to enter the slot formed in the stick and support said stick during the boring operation.

The table V has a slot Y therein, the same extending parallel with the bit U and receiving a screw Z, which is connected with the carriage W, so that the latter may be guided in its advancing and returning motions.

The operation is as follows: The stick is placed upon the slide F and the treadle of the machine operated, whereby the stem D is raised, and with it the bed or table E, with the slide F and the stick thereon, bringing the stick into contact with the rotating saw, thereby forming a slot $A^2$ in said stick, as seen in Fig. 7. As the stick rises it comes in contact with the stop S' and the upward motion of the stick as supported on the slide F is limited, whereby the saw M forms the slot or kerf $A^2$ in the stick to the required extent. The treadle is now let go and the table E, with the stick thereon, descends, so that the stick clears the saw. The stick is now removed from the slide F and fitted on the guide X of the carriage W and the latter is advanced, whereby an opening is bored transversely through the stick, as shown in Fig. 7, so that when the retainer shown in said Fig. 7 is inserted through the slot $A^2$ into the stick, the opening in said retainer and stick will register and the rivet or pin will be passed through the same for holding said retainer in position. The guide X is formed with a slot $a$ to form a registry for the opening in the article made by the boring tool or bit. This is the operation for slotting and boring a hollow stick; but for a solid stick, after the same has been slotted or cut by the saw M, the slide F is advanced, in order to bring the slot beneath the cutters J K L, so as to gouge out one corner of the kerf or slot and pierce the other corner for a retainer of the form shown in Fig. 8. In this case the plunger H is lowered by the action of the lever B', so that the cutters J and L pierce the solid stick, after which the lever C' is operated, whereby the cutter K cuts out one corner of the kerf or slot, all similar to that shown in the patent hereinbefore referred to. When the plunger descends, its sides R press against the gage P and lower the same upon the stick, thus holding the latter and limiting the descent of the plunger. When the cutter K has accomplished its work, the cutters rise and the stick is stripped therefrom, owing to its contact with the under side of the gage, which is in its normal position.

Having thus described our invention, what we claim as new, and desire to secure by Letters Patent, is—

1. A slotting or kerfing machine comprising a base, a rising and falling table for supporting the stick or article to be slotted or kerfed, a slide on said table, a plunger with cutters above said table, a saw, a movable gage P, which is raised automatically by the action of a spring and positively lowered by the descent of the plunger, and the stops S and S', substantially as described.

2. A machine for slotting or kerfing sticks, &c., having a slotting or kerfing device, a boring tool or bit, a carriage for advancing the sticks to and from said tool, an upper plunger carrying cutters, a rising and falling table for supporting the stick or article to be slotted or kerfed, a slide on the latter table, the gage P, which is raised by the action of a spring and lowered by the descent of said plunger, and the stops S and S', substantially as described.

3. A saw and cutters, a rising and falling table supporting the stick or article to be slotted or kerfed, and a rising and falling plunger carrying said cutters, in combination with a movable gage which is raised by the action of a spring and lowered by the descent of said plunger, and a stop against which said gage abuts when the latter is in elevated position, substantially as described.

4. A machine for slotting and kerfing sticks, &c., comprising a rising and falling table supporting the stick or article to be slotted or kerfed, a rising and falling plunger carrying cutters, a movable gage which is raised by the action of a spring and lowered by the descent of said plunger, a stop against which said gage abuts when the latter is in elevated position, a saw mounted on one end of an extended arbor having a drum or pulley thereon, a boring bit or tool attached to the opposite end of said arbor, a slotted support adjacent to said bit or tool, a carriage adjustably mounted on said support, and a slotted guide mounted on said carriage, substantially as described.

JOHN B. JESSON.
JACOB K. WEED.

Witnesses:
JOHN A. WIEDERSHEIM,
A. P. JENNINGS.